UNITED STATES PATENT OFFICE.

FRIEDRICH COLLISCHONN, OF FRANKFORT-ON-THE-MAIN, AND FRIEDRICH RUPPERT, OF MAINZ-MOMBACH, GERMANY, ASSIGNORS TO VEREIN FÜR CHEMISCHE INDUSTRIE IN MAINZ, OF MAINZ, GERMANY.

PROCESS FOR THE MANUFACTURE OF CELLULOSE ESTERS.

1,201,260. Specification of Letters Patent. Patented Oct. 17, 1916.

No Drawing. Application filed August 29, 1913. Serial No. 787,294.

*To all whom it may concern:*

Be it known that we, FRIEDRICH COLLISCHONN, doctor of philosophy and chemist, a subject of the King of Prussia, and resident of 62 Moselstrasse, Frankfort-on-the-Main, Prussia, Germany, and FRIEDRICH RUPPERT, doctor of philosophy and chemist, a subject of the King of Prussia, and resident of 44 Arndstrasse, Mainz-Mombach, Grand Duchy of Hesse, Germany, have invented a Process for the Manufacture of Cellulose Esters, of which the following is a full, clear, and exact specification.

In our Letters Patent No. 1,109,512, dated September 1, 1914, we have described a process for the manufacture of a new cellulose acetate soluble in pure ethyl acetate, consisting in heating solutions of the known cellulose acetates, which contain water but no other substances having a hydrolytic action on cellulose acetates, to a temperature of 90° to 110° C., till a sample of the reaction mass dissolves in ethyl acetate. Now we have further found that the method of the said process can also be employed advantageously for the manufacture of the cellulose esters soluble in acetone. From the hitherto employed processes for the manufacture of the said cellulose esters, the present one is on principle distinguished thereby that it may be executed at a high temperature, that is to say at a temperature of 90° to 110° C., and that the said high temperature may be maintained for any long time, without prejudice for the material, caused by a hydrolytic splitting off of the cellulose molecule. This is of a very great practical importance. For it is known that good acetate solutions are very thick liquids of such a viscosity that they cannot be conveyed practically through pipes, since a pressure of several atmospheres is necessary to move through pipes of a length of 3 to 4 meters the reaction mass at a very moderate speed. So these liquids cannot practically be moved by pumps and it is necessary to transport or convey them by buckets. It is easy to understand what trouble results for the workmen from the transport or conveyance of a mass containing free acetic anhydrid and glacial acetic acid in buckets, without mentioning that such a conveyance or transport is a very uneasy and expensive work. A further inconvenience is that such viscous liquids cannot be easily filtered. Practically this is also of a great importance, since, when for instance plastic masses for combs, jewels, etc., are to be prepared from cellulose acetate, it is absolutely necessary to filter the primary solution, as no raw material is sufficiently pure to furnish directly clear blocks by its working up. Finally the mixing of these viscous liquids with water meets also with difficulties; the formation of large lumps is nearly unavoidable and it is difficult to wash completely the material and to free the same of all acid residues. All these difficulties vanish with the process of the present invention, for in consequence of the higher temperature employed the mixtures are very fluid, can therefore easily be pumped, filtered and precipitated with water. Herewith not only an extraordinary saving of workpower and of worktime but also an important improvement in the quality of the cellulose ester is obtained. The latter progress results also from the thin fluid condition of the reaction masses, which can easily be mixed throughout, whereby a regular and relatively slow reaction course is insured, which can be controlled easily. No hydrolytic splitting of the molecule takes place and the solubility can be carried to the extreme, without injury for the quality of the material.

For the technical carrying out of the process, we proceed according to the manner specified in our Letters Patent No. 1,109,512 for the manufacture of a cellulose acetate soluble in ethyl acetate, with the single difference that the operation is interrupted as soon as a sample shows the desired degree of solubility in a mixture of chloroform and alcohol, in acetone, a mixture of acetone and ethyl acetate, etc.

Example: To the reaction mass obtained for instance according to the process of German Patent No. 159524, by acting cautiously with 800 parts of acetic anhydrid, 600 parts of glacial acetic acid and 5 parts of sulfuric acid on 200 parts of cotton, are added the quantity of acetic acid of 50 per cent. necessary to the transformation into acetic acid of 90 per cent., and 10 parts of sodium acetate and the so obtained mixture is heated to 100°–110° C. till a sample dissolves in acetone to a clear solution which occurs generally 3 to 5 hours earlier than for the cellulose acetate soluble in ethyl acetate, generally obtainable after 20 to 24 hours according to the process of our U. S. Letters Patent No. 1,109,512. In an analogous manner is effected the preparation of other cellulose esters soluble in acetone, provided the solutions of the known cellulose esters insoluble in acetone, which are heated to 90°–110° contain water but no other substance having a hydrolytic action on cellulose esters.

What we claim is:

1. The described process for the manufacture of cellulose esters soluble in acetone, consisting in heating a solution of the known cellulose esters insoluble in acetone, which contains water but no other substances having a hydrolytic action on cellulose esters, to a temperature of 90° to 110° C. till a sample of the reaction mass dissolves in acetone to a clear solution and stopping the reaction before solubility to a clear solution in ethyl acetate is effected.

2. The described process for the manufacture of cellulose acetates soluble in acetone, consisting in heating a solution of the known cellulose acetates insoluble in acetone, which contains water but no other substances having a hydrolytic action on cellulose esters, to a temperature of 90° to 110° C. till a sample of the reaction mass dissolves in acetone to a clear solution and stopping the reaction before solubility to a clear solution in ethyl acetate is effected.

In witness whereof we have hereunto signed our names this 19 day of August, 1913, in the presence of two subscribing witnesses.

FRIEDRICH COLLISCHONN.
FRIEDRICH RUPPERT.

Witnesses:
 WALTER VIEWEZ,
 JEAN GRUND.